(12) United States Patent
Hoch et al.

(10) Patent No.: US 10,239,621 B2
(45) Date of Patent: Mar. 26, 2019

(54) AIRCRAFT SEATING NETWORK INTERFACE

(71) Applicant: Kyntrol LLC, Eastlake, OH (US)

(72) Inventors: Tom Hoch, Eastlake, OH (US); Scott Huling, Chagrin Falls, OH (US); Carl Richter, Chagrin Falls, OH (US)

(73) Assignee: KYNTROL, LLC, Eastlake, OH (US)

( * ) Notice: Subject to any disclaimer, the term of this patent is extended or adjusted under 35 U.S.C. 154(b) by 543 days.

(21) Appl. No.: 14/966,651

(22) Filed: Dec. 11, 2015

(65) Prior Publication Data

US 2016/0096626 A1    Apr. 7, 2016

Related U.S. Application Data (63) Continuation-in-part of application No. PCT/US2014/041317, filed on Jun. 6, 2014.

(60) Provisional application No. 61/834,138, filed on Jun. 12, 2013.

(51) Int. Cl.
| | |
|---|---|
| *B64D 11/06* | (2006.01) |
| *B64D 11/00* | (2006.01) |
| *H02J 4/00* | (2006.01) |
| *B60N 2/02* | (2006.01) |

(52) U.S. Cl.
CPC ...... *B64D 11/0624* (2014.12); *B64D 11/0015* (2013.01); *B64D 11/00155* (2014.12); *B64D 11/06* (2013.01); *B64D 11/064* (2014.12); *B64D 11/0643* (2014.12); *B64D 11/06395* (2014.12); *H02J 4/00* (2013.01);
(Continued)

(58) Field of Classification Search
CPC ............... B64D 11/06; B64D 11/0624; B64D 11/00155; B64D 11/06395
See application file for complete search history.

(56) References Cited

U.S. PATENT DOCUMENTS

| | | |
|---|---|---|
| 4,428,078 A | 1/1984 | Kuo |
| 5,854,591 A | 12/1998 | Atkinson |
| 2003/0098661 A1 | 5/2003 | Stewart-Smith |

(Continued)

FOREIGN PATENT DOCUMENTS

| | | |
|---|---|---|
| WO | 2007/109359 | 9/2007 |
| WO | 2011/133273 | 10/2011 |

OTHER PUBLICATIONS

International Search Report dated Sep. 19, 2014 for corresponding application No. PCT/US2014/041317.

*Primary Examiner* — Nabil H Syed
(74) *Attorney, Agent, or Firm* — Renner Otto Boisselle and Sklar (57) ABSTRACT

A networked suite of aircraft-seat devices is disclosed, wherein the devices receive both power and network communications via the same terminal. The devices may be connected by a two-wire connection and may be configured in a daisy chain. Various aircraft seat devices, such as actuators, may be directly connected to the network or connected via control modules connected to the network. One device on the network may be designated as a master device for controlling network configuration. A method of automatically addressing network devices includes measuring a first quiescent current through the network, enabling an addressing current in unaddressed devices, and measuring the change in current at each device after enabling the addressing currents to determine the last device in the chain.

7 Claims, 4 Drawing Sheets

(52) U.S. Cl.
CPC ............... *B60N 2002/0264* (2013.01); *B64D 2011/0053* (2013.01); *Y02T 50/46* (2013.01)

(56) References Cited

U.S. PATENT DOCUMENTS

| | | |
|---|---|---|
| 2003/0217363 A1 | 11/2003 | Brady et al. |
| 2006/0032979 A1 | 2/2006 | Mitchell et al. |
| 2008/0009989 A1* | 1/2008 | Kim ................ B60N 2/0232 701/36 |
| 2009/0228935 A1 | 9/2009 | Delwaulle |
| 2011/0282495 A1 | 11/2011 | Fischer et al. |
| 2014/0103706 A1* | 4/2014 | Agusti Costa ......... H04B 3/548 307/2 |
| 2016/0020650 A1* | 1/2016 | Distelzweig ............ H02J 50/12 307/104 |
| 2018/0188627 A1* | 7/2018 | Vigano ................. G02F 1/155 |

\* cited by examiner

AIRCRAFT SEATING NETWORK INTERFACE

RELATED APPLICATION DATA

This application is a continuation-in-part of International Application No. PCT/US14/41317 filed on Jun. 6, 2014, which claims the benefit of U.S. Application No. 61/834,138 filed on Jun. 12, 2013, each of which is hereby incorporated by reference in its entirety.

TECHNICAL FIELD OF THE INVENTION

The present technology relates generally to a network interface for aircraft seating, and more particularly to a two-wire interface with communication-over-power capabilities.

BACKGROUND

Aircraft passenger seating comfort currently ranges from a single mechanical adjustment for economy seating to lavish suites with electrical actuators, lumbar adjustments, massage, lighting and many other comforts. For electronically controlled passenger comforts, there are two common system architectures, referred to as "single unit" and "distributed control unit." Single unit architecture uses a single enclosure that houses all electronics used by the passenger. The collection of electronics is often referred to as a "suite," and some or all of the suite may be housed within the actual passenger seat. All electrical actuators, lights, lumbar communication, in-flight entertainment (IFE) communications, and so on, are controlled via a single electronics box. One variation of this architecture houses the power supply in one enclosure and the control electronics in another enclosure.

Such architecture can be cost effective, for example, in applications that require only a few actuators or input output/output devices (e.g., lights). However, as the complexity of the system grows, the wiring in the passenger suite may need to be run back to the control electronics box, which is typically located under the passenger seat. The wiring harnesses can get quite complex and run tens of feet throughout the suite. To add to the complexity, for serviceability, harness disconnects are needed to enable removal of the seat and other components of the suite. The more wire connections that are needed throughout the suite, the larger the size of the electrical disconnects, which increases the weight of the control system. The increased weight can reduce the fuel efficiency of the aircraft, thereby increasing operating costs.

Distributed control unit architecture improves on single unit architecture by using multiple electronics boxes in a distributed controller area network (CAN), which often uses a commination protocol such as CANopen. There is a single master controller box that may include a power supply, or the power supply may be housed in a different enclosure. This single controller communicates using a CAN physical layer to any number of electronic nodes to control actuators, lighting and all other electrical functions of the passenger suite. Each node in the network has its own unique programmed address.

The distributed control unit architecture has a number of advantages over the single unit architecture approach. For example, electronics are distributed at the location they are needed without long runs of multiple wires. Also, only a single cable with power and separate communications wires are required between nodes, which reduces harness complexity and reduces system weight making the aircraft more fuel efficient. Moreover, the system can be easily expanded to include more nodes with only the CAN bus load being a limit. The distributed control unit architecture is further advantageous because the CAN physical layer handles the communications details.

The distributed control unit architecture, however, also has several drawbacks. First, each node is required to have a unique address. While there are several techniques for addressing nodes, including firmware addresses, DIP switch selection, rotary switch selection, and unique resistors values, most of these methods require the user to "program" an address for each node. The resistor technique, for example, sets an address for each node based on unique resistor values either on the node electronics or included in the CAN harness. Second, the bus end node is required to have a line termination resistor. The termination resistor causes some challenges regarding how the end node gets terminated, for example whether the node is user selected or whether it is incorporated in the CAN harness. Third, aviation requires the use of an MTh-spec cable. The cable that is required to run the power and CAN to each node is not a standard cable. The power leads are typically run as one twisted pair and the CAN is run as its own impedance-controlled pair. Fourth, CAN uses a square wave which has inherent odd harmonics making it more difficult to pass the stringent Aerospace regulatory requirements. Further, any special addressing technics must be included. Combining the power and CAN into one cable is typically a special-order item for an aircraft.

SUMMARY OF THE INVENTION

The present disclosure provides a system and method for networking a suite of aircraft-seat devices. Devices on the network receive both power and communication at a single terminal pair. Devices on the network are connected in a daisy chain configuration, may be electrically connected by a simple two-wire connection, and can be automatically assigned a network address. This network design does not require a terminating resistor and minimizes the weight of wire in the aircraft, thus increasing fuel efficiency, and eases the addition, removal and configuration of devices on the aircraft-seat device network. This network can use a sine-wave carrier that does not have any harmonic content.

According to one aspect of the invention, an aircraft-seat device suite includes: at least one electrically-operated aircraft-seat device including a first terminal for receiving power to operate the at least one electrically operated aircraft seat device; and a device network including a second terminal for communicating data between the at least one electrically-operated aircraft-seat device and another device, wherein the first terminal and the second terminal are electrically connected to one another.

According to one aspect of the invention, the electrical connection between the first terminal and the second terminal is a two-wire electrical connection.

According to one aspect of the invention, the at least one electrically-operated aircraft seat device comprises a plurality of electrically-operated aircraft-seat devices, and the first terminal of each of the plurality of electrically-operated aircraft-seat devices is electrically connected to other first terminals of the plurality of electrically-operated aircraft seat devices via a daisy-chain configuration.

According to one aspect of the invention, one of the plurality of electrically-operated aircraft-seat devices is designated is a master device.

According to one aspect of the invention, at least one of the plurality of aircraft-seat devices comprises an auto-addressing module, the auto-addressing module having: a switch mechanism (104) allowing the aircraft-seat device to draw an addressing current; a memory for storing an instantaneous current value and an address; and circuitry for comparing an instantaneous current value with a current value stored in the memory.

According to one aspect of the invention, the at least one electrically-operated aircraft-seat device comprises an actuator configured to receive both power and data at the first terminal.

According to one aspect of the invention, the actuator is operatively coupled to at least one of a seat back and a seat surface of an aircraft seat to vary an angle of the seat back relative to the seat surface.

According to one aspect of the invention, the actuator is operatively coupled to at least one of a leg rest and a seat surface of an aircraft seat to vary an angle of the leg rest relative to the seat surface.

According to one aspect of the invention, the actuator comprises an electric motor.

According to one aspect of the invention, the at least one electrically-operated aircraft-seat device comprises a suite-control module.

According to one aspect of the invention, at the at least one electrically-operated aircraft-seat device comprises an input/output module.

According to one aspect of the invention, the at least one electrically-operated aircraft-seat device comprises a display device.

According to one aspect of the invention, the at least one electrically-operated aircraft-seat device comprises a lighting device.

According to one aspect of the invention, the at least one electrically-operated aircraft-seat device comprises an audio device.

According to one aspect of the invention, the at least one electrically-operated aircraft-seat device comprises a climate control device.

According to one aspect of the invention, at least one of the plurality of aircraft-seat devices comprises a diagnostic display.

According to one aspect of the invention, the data comprises digital data.

According to one aspect of the invention, the data comprises a data packet, each data packet having: data representing a node address; data representing a command; additional data relating to the command; and data representing a checksum.

According to one aspect of the invention, a method of controlling an aircraft-seat device suite is provided, the aircraft-seat device suite having a plurality of electrically-operated aircraft-seat devices. The method includes using a common conductor to provide both power for operating the plurality of aircraft-seat devices and network connectivity for communicating between the plurality of aircraft-seat devices.

According to one aspect of the invention, the common conductor is a two-wire electrical connection.

According to one aspect of the invention, the plurality of electrically-operated aircraft-seat devices are connected by the common conductor in a daisy-chain configuration.

According to one aspect of the invention, the method includes designating one of the plurality of electrically-operated aircraft-seat devices as a master device.

According to one aspect of the invention, the method includes assigning a unique address to an unaddressed device of the plurality of electrically-operated aircraft-seat devices by: measuring a first quiescent current through the electrically-operated aircraft-seat device; storing data representing the magnitude of the first quiescent current through the electrically-operated aircraft-seat device in a memory of the aircraft-seat device; enabling an addressing current in the electrically-operated aircraft seat device; measuring a second current through the electrically-operated aircraft-seat device; comparing the second measured current to the first measured quiescent current; and if there is no net change in current between the first measured quiescent current and the second measured current, setting the electrically-operated aircraft-seat device to a predetermined address.

According to one aspect of the invention, the method includes changing the predetermined address, and repeating the assignment step.

According to one aspect of the invention, a non-transitory computer readable medium storing a computer program on an aircraft-seat device is provided. The program, when executed, is configured to communicate with at least one other aircraft-seat devices by: transmitting data packets to at least one of the at least one other aircraft-seat devices over a pair of conductors electrically connecting the plurality of aircraft-seat devices; receiving data packets from at least one of the at least one other aircraft-seat devices over a pair of conductors electrically connecting the aircraft-seat device and the at least one other aircraft-seat device; handling errors in the sending and receiving of data packets; and implementing safety algorithms when communications between the aircraft-seat device and the at least one other aircraft-seat devices are lost.

According to one aspect of the invention, the program is configured to update computer programs of the at least one other aircraft-seat device.

According to one aspect of the invention, the data packets include: data representing a node address; data representing a command; additional data relating to the command; and data representing a checksum.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments. Further, although method descriptions and flow charts may show specific orders of executing steps, the order of executing the steps may be changed relative to the order described. Also, two or more steps described in succession may be executed concurrently or with partial concurrence. One or more of the described or illustrated steps may be omitted.

Figure 1:
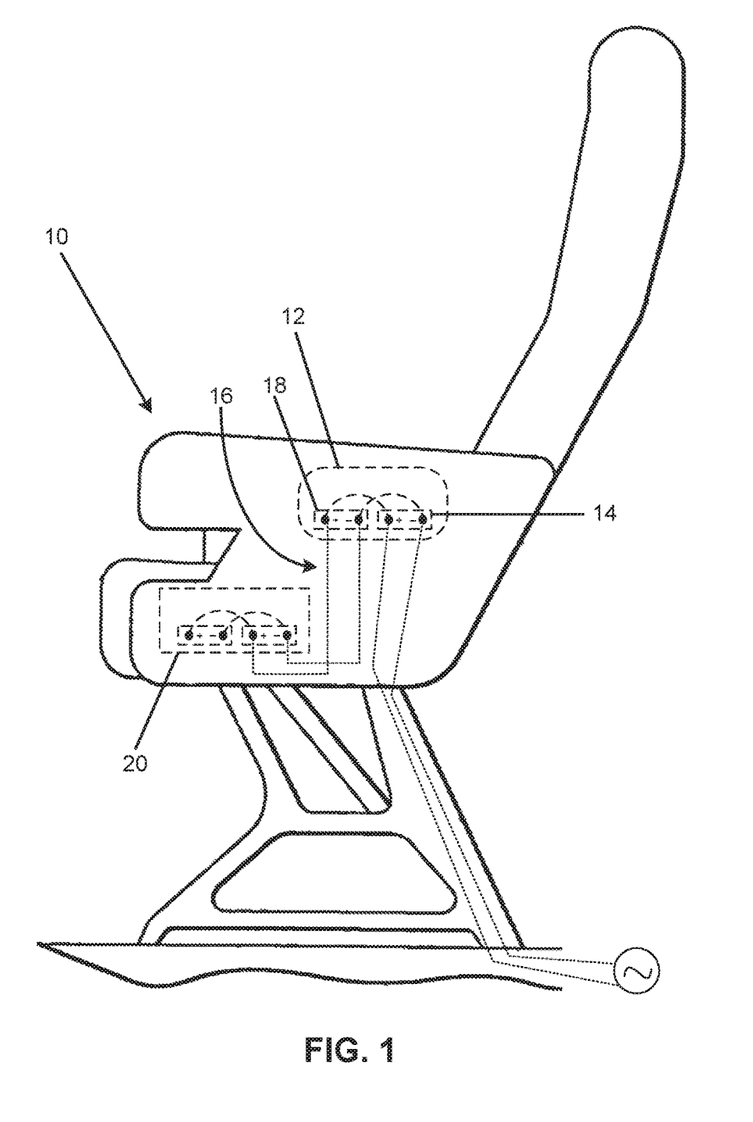
FIG. 1 is a schematic view of an exemplary aircraft seat featuring a suite of networked devices.

Referring now in detail to the drawings, and initially to FIG. 1, an aircraft seat 10 is illustrated with an exemplary device suite that includes at least one electrically-operated aircraft-seat device 12 including a first terminal 14 for receiving power to operate the at least one electrically operated aircraft-seat device. A device network 16 includes a second terminal 18 for communicating data between the aircraft-seat device 12 and another device 20 (which may be another aircraft seat/suite, or some other device unrelated to the aircraft seat/suite). The first terminal 14 and the second terminal 18 are electrically connected to one another. Alternatively, instead of separate data and power terminals on the device, a single terminal pair may be provided on an external portion of the aircraft-seat device. Communication circuitry (as described below) inside the device may then be connected to the single terminal pair to split data and power from the incoming signals. A configuration using a single terminal pair may simplify wiring to the device by requiring less terminal connections.

In one embodiment, the electrical connection between the second terminal and the first terminal is a two-wire electrical connection. A two-wire connection reduces the amount and weight of wiring required for the system. The weight reduction, when aggregated over a number of seats of an aircraft, can significantly reduce the weight of the aircraft, increasing fuel economy. Moreover, a two-wire design can conform to United States Defense Standard ("MIL-SPEC") often required for aircraft wiring. The wires may be considered to have positive and negative polarity respectively.

Data transfer over the DC-powered wires of the C-Bus may be effectuated by a digital communications universal asynchronous receiver/transmitter (UART) integrated circuit. Exemplary UARTs that could be used to transfer data over the DC Power lines include CY8CPLC10, marketed by Cypress Semiconductor, and MAX2982 NXP-TDA5051A, marketed by Maxim Integrated. The data carrier frequency and communications rate may be selected by the system developer. Data may be transferred serially byte by byte over the power line. A series inductor may be used at each C-Bus device to isolate the device electronics from interfering with the C-Bus communication signals.

Figure 2:
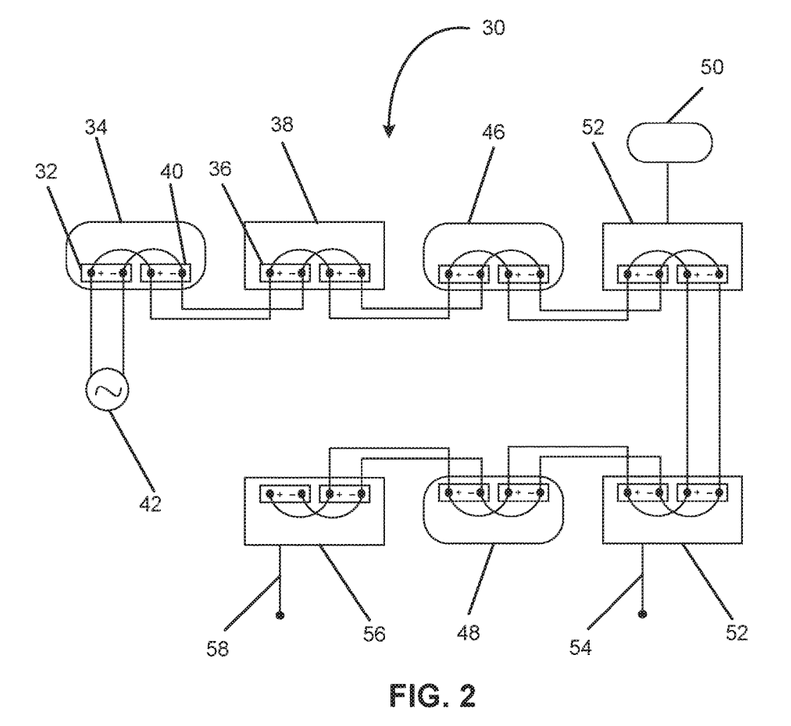
FIG. 2 is a schematic view of an exemplary networked aircraft-device suite shown outside of an aircraft seat.

FIG. 2 depicts an exemplary aircraft-seat device suite 30 (shown outside of an aircraft seat) containing a plurality of electrically-operated aircraft-seat devices. The first terminal of each of the plurality of electrically-operated aircraft-seat devices, for example first terminal 32 of device 34, is electrically connected to other first terminals of the plurality of electrically-operated aircraft seat devices, for example first terminal 36 of device 38, via a daisy-chain configuration. Hereinafter, the device suite 30 and other similarly daisy-chain-configured device suites will be referred to as a "C-Bus." The electrical connection between the first terminal 32 of the first device 34 may occur through a second terminal 40 of the first device 34 (which is electrically connected to the first terminal 32, for example, via an internal connection), and so on for other devices in the C-Bus.

The entire C-Bus 30 may be powered by a power supply 42 electrically connected to the first terminal 32 of the first device 34. Power is then carried form each device to the next in the C-Bus to supply power to all devices in the C-Bus. The power supply may be a direct current ("DC") power supply and, typically for aircraft applications, the power supply is 28V or 33V. However, depending on the specific application and configuration of each device, and the inputs and outputs of the C-Bus, the C-Bus may operate, for example, over a range of 8V to 42V. A single power supply of the aircraft may be directly connected to each C-Bus in the aircraft. Alternatively, each or some of the C-Bus networks may contain a power supply unit that regulates the power supply to its respective C-Bus.

At least one of the aircraft-seat devices of the C-Bus 30 may be an electrically-operated an actuator, such as smart actuator 34, configured to receive both power and data at the first terminal 32. A "smart" actuator as used herein is any actuator or set of actuators that also includes circuitry configured for electrical connection and communication with a C-Bus. For example, a smart actuator such as smart actuator 34 may include a first terminal for 32 for receiving power and communication and a second terminal 40 for connection to further devices on the C-Bus. An actuator may be any device suitable to convert electrical energy into kinetic energy or motion. For example, the actuator may be configured to create linear or rotary motion, and may utilize a DC or brushless DC motor.

The C-Bus 30 may contain several smart actuators, for example, smart actuators 34, 46 and 48. In addition to smart actuators, standard actuators (i.e., actuators without circuitry for connection to a C-Bus) such as actuator 50, may be connected to a C-Bus through a control module, such as actuator control module 52. The actuator control module may include circuitry to translate commands received via the C-Bus into an output for controlling one or more specific actuators.

In one embodiment, the C-Bus includes a suite control module (SCM), such as SCM 52 of C-Bus 30. While the C-Bus does not require a control module to function (as discussed later, any device on the C-Bus can serve as a controller), a standalone control device may be used to consolidate system control. The SCM 52 may include one or more input/output (I/O) ports, such as port 54. The ports may be used for monitoring the system, configuring the system, uploading firmware or software to the system, and downloading system data. Port 54 could also be used for digital, analog or serial communication, for example to connect an in-flight entertainment system or to provide access to an Internet network on the aircraft. Port 54 can also be used to connect lighting and temperature control components, as discussed more fully below. Port 54 may be a wired communication port, for example USB, Ethernet, Firewire, etc. Port 54 may also be a wireless communication port using a protocol such as WiFi, or Bluetooth. Communication over port 54 may be analog or digital.

One of the devices in the C-Bus may be designated as a master device. The master device may be a dedicated control unit for the suite, to control communications between and regulation of suite devices. For example, if the C-Bus includes an SCM, then the SCM is likely most suitable to be designated as the master device. Alternatively, the device suite may have no dedicated control device and any device of the suite, for example a smart actuator, may have requisite circuitry to be designated as the master device for the suite. As described later in more detail, the master device may control functions such as auto-addressing, software updating, and error handling for the device suite.

C-Bus 30 may also contain one or more I/O modules, such as I/O module 56. Similar to SCM 52, I/O module 56 contains an I/O port 58. The I/O port 58 is designed to be any of the types for any of the purposes described above with respect to SCM 52. In a system with an SCM, however, the I/O module may not perform controlling functions such as system configuration. One or more I/O modules may be desirable to ease connection and disconnection of devices from the C-Bus 30. For example, if light and temperature controls are connected to one I/O module, and inflight entertainment controls connected to another, the inflight entertainment system may be easily disconnected or swapped out without disturbing the temperature and light controls.

Figure 3:
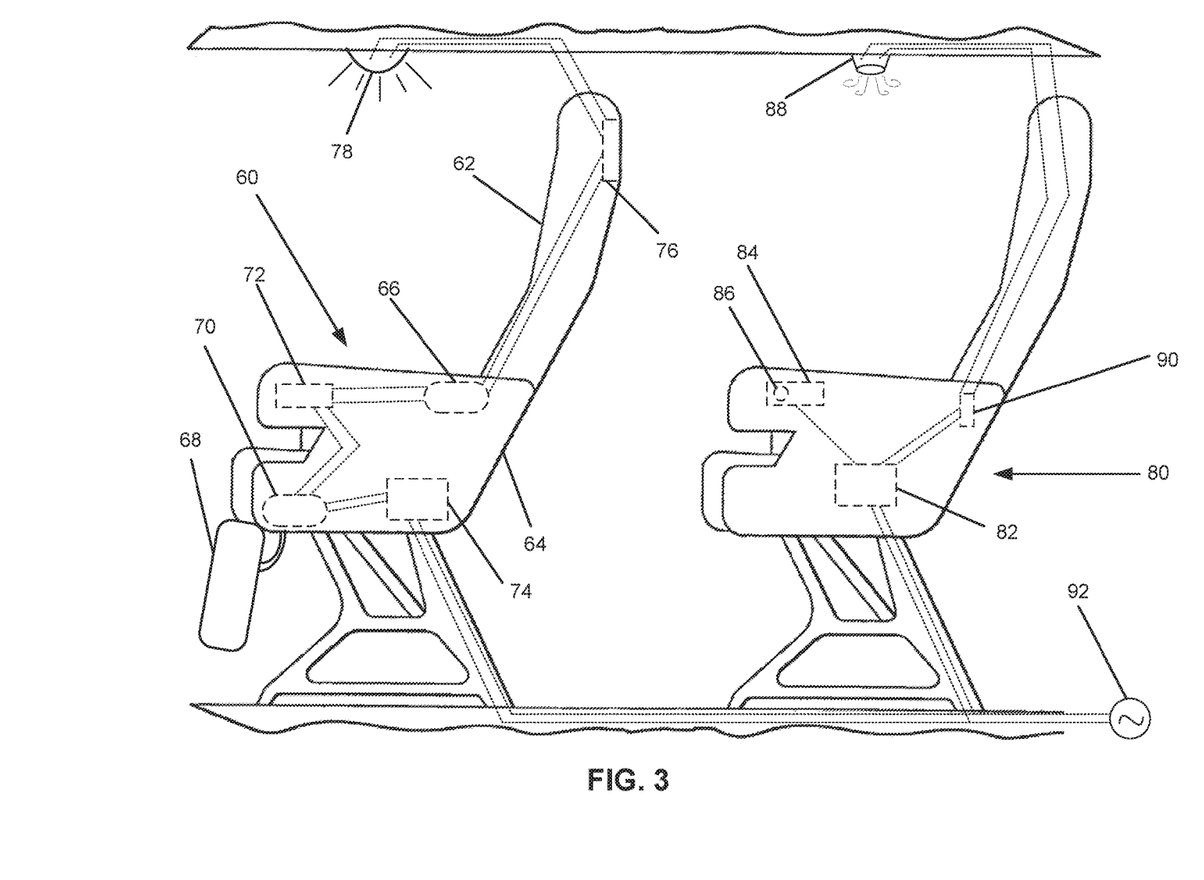
FIG. 3 is a schematic view of a pair of exemplary aircraft seats featuring various networked aircraft devices.

Turning to FIG. 3, illustrated is an exemplary set of aircrafts seats 60 and 80, each having a different exemplary set of aircraft-seat devices connected via C-Buses. Aircraft seats may come with any number of features or components to increase passenger comfort and safety. For example, exemplary aircraft seat 60 includes a seat back 62 that is adjustable relative to the seat surface 64. A smart actuator 66 is operatively coupled to the seat back 64, seat surface 66, or both, and is configured to control the angle of the seat back 62 relative to the seat surface 64. The smart actuator 66, while depicted in the seat surface 64 of seat 60, may actually be housed within the seat back 62, or in a joint between the two. In exemplary seat 60, the smart actuator 66 is electrically connected to a C-Bus using a two-wire connection. One advantage of the C-Bus design is that the order of devices in the chain is not relevant. Thus the configuration of devices of exemplary seat 60 is only one of many possible configurations. Moreover, movement of the seat back relative to the seat surface may be implemented through a plurality of smart actuators, or standard actuators connected to the C-Bus through an actuator control module, as discussed earlier.

Exemplary aircraft seat 60 also includes a leg rest 68 that is adjustable relative to the seat surface 64. A smart actuator 70 is operatively coupled to the leg rest 68, seat surface 64 or both, and is configured to vary the angle of the leg rest 68 relative to the seat surface 64. The smart actuator 70, while depicted in the seat surface 64 of seat 60, may actually be housed within the leg rest 68, or in a joint between the two. In exemplary seat 60, the smart actuator 70 is electrically connected to a C-Bus using a two-wire connection.

Aircraft seat 60 further includes a seat control-input module 72. The seat control-input module includes inputs allowing a passenger to adjust the positions of the seat back 62 and leg rest 68 relative to the seat surface 64. As depicted in seat 60, seat control-input module 72 is directly connected to the C-Bus, and would thus transmit commands to activate and position the smart actuators 66 and 70 directly over the C-Bus. The seat control-input module 72 may also be a device without C-Bus connectivity, and may instead be communicatively connected to a suite control module or I/O module of the C-Bus, for example SCM 74 of seat 60.

Aircraft seat 60 also contains a display device 76. The display device 76 may embedded within the back of a seat, as in exemplary seat 60, or may be affixed to back of the seat for viewing by a passenger of a seat behind the seat having the display device 76. The display device 76 may also be embedded in an armrest of the seat 60 and removable from the armrest for viewing by the passenger of that seat. The display device 76 may be used for many different purposes, such as inflight entertainment including movies and video games, advertisement, and flight or emergency information. The display could also be used to view diagnostic information of the C-Bus.

The display 76 may be of any suitable design, such as a flat-screen liquid crystal display. The display may include touch-screen capabilities allowing a user to enter inputs by touching the display 76. Controls for picture quality and brightness of the display 76 may be included on the device itself, or in a separate control module otherwise accessible to a passenger viewing the display 76. If the display 76 includes touchscreen input, the display may serve as a seat-control input for a passenger to control various devices of the seat such as seat position, audio volume, lighting elements, and/or temperature control.

A lighting device 78 is also connected to the devices of seat 60 through the C-Bus of seat 60. With regards to exemplary seat 60, the lighting device 78 is embedded in a ceiling above the seat 60. However, a lighting element 78 could also be embedded in a wall next to the seat 60 or in the seat itself. In seat 60 the lighting device 78 contains circuitry for direct connection to the C-Bus, but a lighting element without C-Bus connection circuitry can still be connected to the C-Bus through an SCM or I/O module. The wires connecting the lighting element 78 to other devices in the seat 60 may be run through a wall connecting the ceiling above the seat to the floor below the seat. Further, the seat control-input 72 may include inputs for turning the lighting element 78 on and off, and for dimming the lighting element 78. The C-Bus can also communicate/distribute its power to "smart" lights (e.g., lights that need a control signal to dim or change colors, etc.) as well as powering "non-smart" lights (e.g., lights that are locally switched using, for example, a hall-effect switch) thereby minimizing the complex wiring.

Exemplary aircraft seat 80 depicts several other types of aircraft-seat devices. Like exemplary seat 60, exemplary seat 80 also includes an SCM 82 connected to a C-Bus of the seat 80. Seat 80 also includes an inflight entertainment control 84. Inflight entertainment control 84 may be embedded within an armrest of the seat 80 and may be removable from the seat 80 and tethered by wire to the seat and the devices therein. Inflight entertainment control 84 may include buttons or other controls for gaming, a keyboard and/or numerical keypad, a touch-sensitive input, and/or an audio input for voice command.

Exemplary aircraft seat 80 also may include one or more audio devices. For example, seat 80 includes an audio-out jack 86 within the inflight entertainment control 84 for connecting headphones or portable speakers. The audio-out jack 86 may also be located elsewhere within the seat 80, or may be located on or near a display for a passenger in the seat 80, including a display such as display 76 that is embedded within seat 60 in front of seat 80. Seat 80 may also include a speaker as an audio output. For example, if inflight entertainment control 84 is removable from the seat 80, the inflight entertainment control 84 may include a speaker that can be held to a passenger's ear to receive sound for inflight entertainment.

A climate control device 88 is also connected to the devices of seat 80 through the C-Bus of seat 80. With regards to exemplary seat 80, the climate control device 88 is embedded in a ceiling above the seat 80. However, a climate control device 88 could also be embedded in a wall next the seat 80 or in the seat itself. In seat 80 the climate control device 88 contains circuitry for direct connection to the C-Bus, but a climate control device without C-Bus connection circuitry can still be connected to the C-Bus through an SCM or I/O module. The wires connecting the climate control device 88 to other devices in the seat 80 may be run through a wall connecting the ceiling above the seat to the floor below the seat.

The climate control device 88 may include heating elements, cooling elements, and/or a fan. Alternatively the climate control device 88 may simply include an adjustable vent connected to climate and/or ventilation system of the aircraft. Passenger controls for the climate control device 88 may be embedded with the inflight entertainment control 84 of seat 80. Alternatively an input control for climate control device 88 may be a standalone element in the seat 80 with C-Bus circuitry connected directly to the C-Bus, or without C-Bus circuitry and connected to the C-Bus via SCM 82 or an I/O module. The climate control device 88 could also be controlled by inputs in the display screen 76 in seat 60. The controls, wherever located, may allow a passenger to adjust parameters such as air temperature and airflow through the climate control device 88.

Seat 80 also includes a small diagnostic display, or "BITE" display module 90. The BITE (Built-In-Test-Equipment) display module may be used by technicians to retrieve diagnostic or status information about the C-Bus. The status information may be displayed as alphanumeric data on built-in seven-segment displays. The specific information displayed may depend on the specific system requirements of the C-Bus. The BITE display module 90 may also include a serial port for downloading diagnostic and status information to a computer or other device.

The devices and C-Buses of exemplary seats 60 and 80 are connected to power supply unit 92 that supplies power to the systems as described earlier. While several types of aircraft seat device are listed above, the invention is not limited to these devices alone, and many other devices could be connected directly to a C-Bus, if the device contains sufficient circuitry, or connected to a C-Bus through an SCM or I/O module. Some other possible aircraft-seat devices, not pictured, include, but are not limited to, power supply ports, network connection ports, and telephones.

Figures 4, 5, 6:
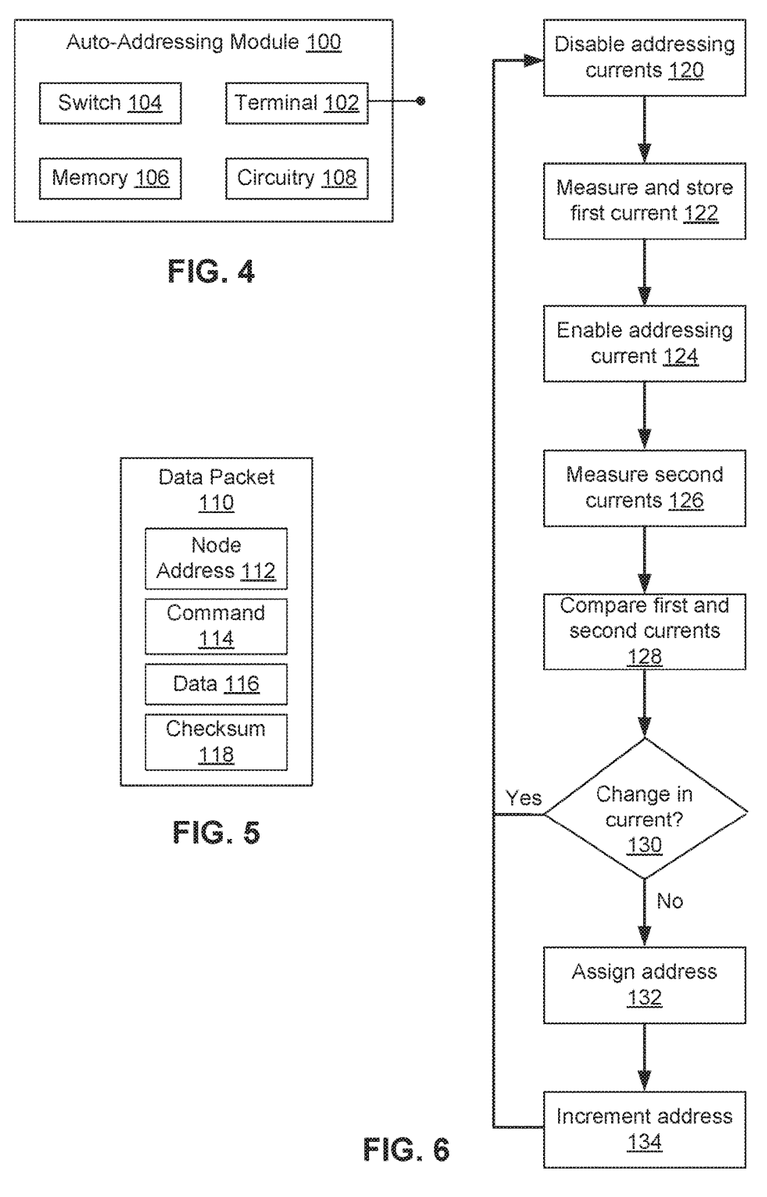
FIG. 4 is a system diagram of an exemplary auto-addressing module for a device on a device-suite network.
FIG. 5 is a system diagram of an exemplary data packet for communication on a device-suite network.
FIG. 6 is a flow diagram for an exemplary method for automatically addressing devices on a device-suite network.

FIG. 4 illustrates a system diagram of an exemplary auto-addressing module 100 that can be included in any of the above-described devices, when connected to a C-Bus, to automatically assign a unique address to that device on the C-Bus. The method of auto-addressing will be described later with more detail. The auto-addressing module 100 includes a terminal 102 for receiving power and receiving and/or sending communication via the C-Bus. The terminal 102 may be the same terminal or a shared terminal for the device as described earlier, or a separate terminal connected to the device. The auto-addressing module 100 also includes a switch 104 that determines whether or not the device draws a specific addressing current. The switch 104 may be any suitable type of electrical switching mechanism, for example a simple transistor switch.

The auto-addressing module 100 further includes a memory 106. The memory 106 is a non-transitory computer readable medium and may be embodied as one or more of an electronic memory (e.g., a buffer or a flash memory), a magnetic memory (e.g., a hard drive), or an optical memory (an optical disk). In a typical arrangement, the memory 106 may include a non-volatile memory for long-term data storage and a volatile memory that functions as system memory (e.g., RAM) for control circuitry, for example control circuitry 108. The memory 106 may exchange data with the control circuitry 108 over a data bus. The control circuitry 108 may include a processor or microprocessor and/or other digital or analog logic designed to control function of the auto-addressing module 100, or may be embodied as an application-specific integrated circuit (ASIC).

FIG. 5 depicts an exemplary data packet 110 used for communications between devices on a C-Bus. The data packet 110 includes a node address field 112 that contains data representing the address on the C-Bus of device to which the data packet is being sent. The data packet 110 also includes a command field 114 that contains data representing a command to be performed by the target node. A data field 116 would include any specific data associated with the command in field 114. Finally a checksum field 118 contains a checksum value used to verify that the data packet contains no erroneous data. One simple method of creating a checksum involves creating a parity byte, which involves dividing the bits of the data into blocks and running an exclusive or function on the blocks.

For example, looking briefly back to exemplary seat 60 of FIG. 3, a user may press a combination of buttons on seat control-input module 72 to raise the leg rest 68 by 10 degrees. The user action may cause the seat control-input module 72 to create a data packet as follows: the node address field 112 of the data packet could contain the address of the smart actuator 70; the command field 114 would contain a command requesting that the actuator 70 move so as to adjust the leg 68 rest relative seat surface 64; the data field could contain parameters for the command, such as the degree of movement and direction (or just degree if sign is used to denote direction); and the checksum field 118 could contain a parity byte derived from the data packet. The data packet would then be transmitted along the C-Bus device chain. Other devices on the C-Bus would ignore the data because the address in the node address field 112 does not match the address of the device. When the smart actuator 70 receives the data packet, it will run the command to adjust the leg rest according to the given data.

Turning to FIG. 6, illustrated is a flow diagram depicting a method for assigning a unique address to one or more devices of a C-Bus. As described earlier, data packets transmitted on the C-Bus contain a field for a destination address, and thus data is routed through the C-Bus based on an address of each device. Devices may be hardcoded with an address such that no address assignment is necessary. However, the C-Bus system anticipates devices being inserted and removed from the system in any number of different configurations. Therefore, dynamic addressing is advantageous for the system.

Auto-addressing may be controlled by a single device on the C-Bus. If the C-Bus includes an SCM, then the SCM may serve as controller for auto-addressing. If an SCM is not present on the C-Bus, then the device designated as the master device can control auto-addressing. For a device to be given an address using the auto-addressing method, the device should have an auto-addressing module or similar component as described herein.

The auto-addressing method begins at step 120, in which the controlling device sends a command to all devices on the C-Bus to disable their addressing currents. As explained above, each auto-addressing module includes a switch to enable or disable an addressing current. The initial command at step 120 will request that all auto-addressing modules turn the switch off so that the auto-addressing modules are not drawing any additional current. The current through the system with all addressing currents disabled may be referred to as a "quiescent" current through the C-Bus.

At step 122, the controller sends a command to all unaddressed devices on the C-Bus to measure and store the value of the quiescent current at the device. The value of the quiescent current, in any suitable form, is stored in a memory of the auto-addressing module.

At step 124, the controller sends a command to all unaddressed devices on the C-Bus to enable its addressing current. In response to this command, each unaddressed module will turn its enabling switch on so that the module is drawing additional current.

At step 126 the controller sends a command to all unaddressed devices on the C-Bus to measure the value of the second current through the module with the addressing currents enabled. At step 128 the controller sends a command to all unaddressed devices to compare the stored first quiescent current with the second current measured after the addressing currents are enabled. Both the measuring step 126 and comparing step 128 may be accomplished through a single command. The effect of the addressing currents is such that the last unaddressed device in the C-Bus chain will see no change in current, because there is no device drawing current after that first device. The next unaddressed device in the chain, however, will measure a change in current from the quiescent current due to current draw from the last device, and so on along the chain.

If a change in current is not detected at step 130, the method moves to step 132 where the controller sends a command to assign a predetermined address to the last device in the C-Bus, i.e. the device with no net change between the first quiescent current and the second current. The device will store that address for future use until such time as the system may reset or be readdressed. The predetermined address used may be in any form and may start at any place in any suitable sequence of addresses. The addresses may be in a pre-stored list on the controller or may be an incrementable number or letter combination with only the next assignable address being stored.

At step 132, devices that do measure a net change in current will have no address assigned. The controller may send a command over the C-Bus targeting all unaddressed devices to assign a specified address if the device measures no net change in current. As described above, when the addressing currents are enabled, only the last enabled device in the chain will see no change in current because the current measured at earlier devices in the chain will be affected by the current draw of devices later down the chain.

At step 132, the controller increments its predetermined address so that the next assigned address will be the next on its stored list or the next in a sequence of addresses.

The above method may repeat until there no longer are any unaddressed devices on the C-Bus. For example, after the method is performed once, the last unaddressed device in the chain will be assigned an address. If the method is subsequently performed again, that last device will no longer respond to the command to enable its addressing current. Thus, the second time the method is performed, the next-to-last device in the chain will be the last unaddressed device and will be the only unaddressed device to see no net change in current. That device will be assigned the next address and so on. Further, once an address is has been set for each device the respective addresses can be stored in non-volatile memory of the respective device. As a result, the auto addressing routine need not execute each time the system is powered up. In the event a new (unaddressed) device is detected on the network, devices can be "unaddressed" and then the auto addressing scheme can be executed.

In one embodiment a plurality of devices (also referred to as Line Replaceable Units (LRUs)) may be assigned a unique serial number, which can be part of every packet sent over the network. This allows LRUs in adjacent seats to reject packets overheard due to less than perfect shielding and other real-world conditions. This value may be called the AXT Serial Number (Anti-Cross Talk).

A purpose of the AXT cycle is to establish a common serial number on all nodes of a given network, without using C-bus. The AXT cycle sends out current pulses that can be deciphered by each node. The AXT cycle can take the serial number of the last LRU on the network and propagate it to the rest of the network. In order to protect against crosstalk with any LRU swapped into any position, each LRU can be given a serial number that is unique across all C-bus nodes.

A first phase of an AXT cycle determines which node is the last one on the network. That is to say, the node that is farthest from the power supply. Recall that power flows from the power supply, thru an inductor, into the first node and out again, and so on. Each node has the ability to measure how much current is flowing thru it to the rest of the network. Each node also has the ability to turn on a dummy load, which draws prescribed current (e.g., 40 mA). The sequence begins at power-up, an exemplary sequence being provided below.

1. Each node turns off its load for a prescribed time period (e.g., 450 mSec). In the middle of this period, the node samples for a prescribed time period (e.g., 50 mSec).
2. Each node turns on its load for a prescribed time period (e.g., 450 mSec). In the middle of this period, the node samples for 50 mSec.
3. If the difference between the two measurements is less than half a single dummy load, the node considers itself the last one on the network.
4. The last node turns on its load for a prescribed time period (e.g., 450 mSec). The other nodes wait for a prescribed time period (e.g., 200 mSec) and then sample for a prescribed time period (e.g., 50 mSec). This teaches the nodes the current value corresponding to a '1' (the nodes already sampled a '0' in step 1).
5. The last node sends '0' for a prescribed time period (e.g., 200 mSec), and the other nodes wait for a prescribed time period (e.g., 150 mSec).
6. The last node sends its own unique device serial number by pulsing its load for a prescribed number of times (e.g., 32 times). A '0' pulse lasts a first time period (e.g., 28 mSec) and a '1' pulse lasts a second time period different from the first time period (e.g., 58 mSec). The slaves identify any pulse longer than the first time period plus a prescribed offset (e.g., a pulse longer than 43 mSec a '1'.
7. Step six is repeated two more times with a pause for resynch in between.
8. If two of the three received values match, they are used and the AXT cycle is deemed a success. If none match, the cycle has failed and a predetermined value (e.g., FFFFFFFE (minus 2)) is passed to the system. The firmware will recognize this value as illegitimate and not permit use of the data.

The AXT Cycle may be skipped when a saved AXT Serial Number is in a Settings page of the node, and there is an executive program executing (e.g., an executive program executing in a laptop computer communicatively coupled to the system). The complete power up with saved AXT can be, for example:

1. The nodes all power up running a bootloader.
2. The nodes recover their saved AXT Serial Numbers from their respective Settings page.
3. The SCM activates C-bus and performs a simple auto-address.
4. SCM waits for a Power-on Delay to provide a laptop a chance to abort the executive program.
5. The SCM launches its executive program and commands the slaves to do the same.
6. The slaves recover their saved AXT Serial Numbers and C-bus addresses from their respective Settings page.
7h. The SCM verifies the presence of the complete system.

If a node gets replaced, a means is provided to re-arm the AXT cycle and reconstruct the system. For example, if a slave node is powered up and does not hear a message using its saved AXT Serial Number for a prescribed time period (e.g., one minute), it can erase the number and its saved C-bus address. If an SCM verifies a saved system (step 7 in the previous section) and comes up short, it will try an auto-address for a prescribed number of times. If this fails to recover a complete system, the SCM will issue a command to all its slaves to forget the saved AXT information and do the same itself.

The system may include a software program stored in a memory on each or some of the devices on the C-Bus. The software may perform general communication functions and/or functions related to controlling the C-Bus. While typically only one device of a C-bus will act as a controller or master, installing the same software on some or all devices allows flexibility to change which device is controlling should a device be removed or malfunction. Specifically, the software may implement communication protocol, error handling functions and safety algorithms when communications between one or more aircraft-seat devices are lost.

For example, the software may include an acknowledgment feature to acknowledge receipt of a data packet. The software may further include instructions to resend a packet if no acknowledgement is received within a certain preset time period (i.e. timeout and retry functions). The software may include instructions for sending and handling global commands, for example commands sent to all devices on the C-Bus or a set of devices such as all unaddressed devices. The software may facilitate a re-sync of the system by erasing all addresses of auto-addressed devices and re-auto addressing the system. The software may also include functions to provide status updates to a central system or a technician.

The software may further include provisions for updating the software on all devices on the C-Bus. Each module may store a version identifier for the software, and the software may periodically query all devices on the C-Bus to check that all have matching software versions. Should any devices not have a matching version, the software may initiate a system shut-down and force an update of the software so that all devices are operating on the same version. The software may alert a technician of the fault via a BITE display module as described earlier.

Although the principles, embodiments and operation of the present invention have been described in detail herein, this is not to be construed as being limited to the particular illustrative forms disclosed. It will thus become apparent to those skilled in the art that various modifications of the embodiments herein described may be made without departing from the scope of the invention.

What is claimed is:

1. An aircraft-seat device suite, comprising:
    at least one electrically-operated aircraft-seat device including a first terminal for receiving power to operate the at least one electrically operated aircraft seat device; and
    a device network including a second terminal for communicating data between the at least one electrically-operated aircraft-seat device and another device, wherein the first terminal and the second terminal are electrically connected to one another,
    wherein the at least one electrically-operated aircraft seat device comprises a plurality of electrically-operated aircraft-seat devices, and the first terminal of each of the plurality of electrically-operated aircraft-seat devices is electrically connected to other first terminals of the plurality of electrically-operated aircraft seat devices via a daisy-chain configuration, wherein at least one of the plurality of aircraft-seat devices comprises an auto-addressing module, the auto-addressing module having:
    a switch mechanism allowing the aircraft-seat device to draw an addressing current;
    a memory for storing an instantaneous current value and an address; and
    circuitry for comparing the instantaneous current value with a current value stored in the memory.

2. The aircraft-seat device suite of claim 1, wherein the at least one electrically-operated aircraft-seat device comprises an actuator configured to receive both power and data at the first terminal.

3. The aircraft-seat device suite of claim 2, wherein the actuator is operatively coupled to at least one of a seat back and a seat surface of an aircraft seat to vary an angle of the seat back relative to the seat surface.

4. The aircraft-seat device suite of claim 2, wherein the actuator is operatively coupled to at least one of a leg rest and a seat surface of an aircraft seat to vary an angle of the leg rest relative to the seat surface.

5. The aircraft-seat device suite of claim 2, wherein the actuator comprises an electric motor.

6. A method of controlling an aircraft-seat device suite, the aircraft-seat device suite having a plurality of electrically-operated aircraft-seat devices, the method comprising:
    using a common conductor to provide both power for operating the plurality of aircraft-seat devices and network connectivity for communicating between the plurality of aircraft-seat devices;
    assigning a unique address to an unaddressed device of the plurality of electrically-operated aircraft-seat devices by:
    measuring a first quiescent current through the electrically-operated aircraft-seat device;
    storing data representing the magnitude of the first quiescent current through the electrically-operated aircraft-seat device in a memory of the aircraft-seat device;
    enabling an addressing current in the electrically-operated aircraft seat device;

measuring a second current through the electrically-operated aircraft-seat device;

comparing the second measured current to the first measured quiescent current; and if there is no net change in current between the first measured quiescent current and the second measured current, setting the electrically-operated aircraft-seat device to a predetermined address.

7. The method of claim 6, further comprising:

changing the predetermined address; and repeating the steps of claim 6.

* * * * *